United States Patent Office 2,996,869
Patented Aug. 22, 1961

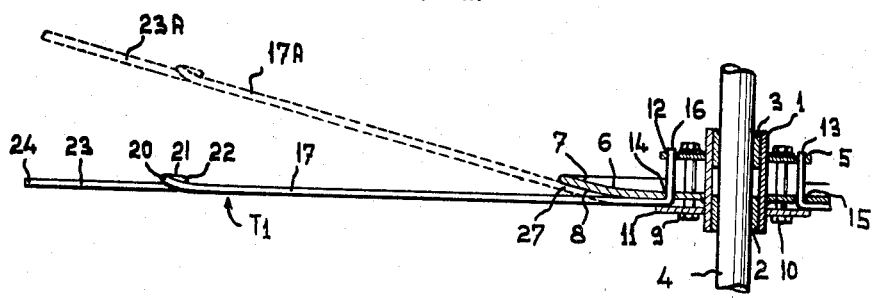
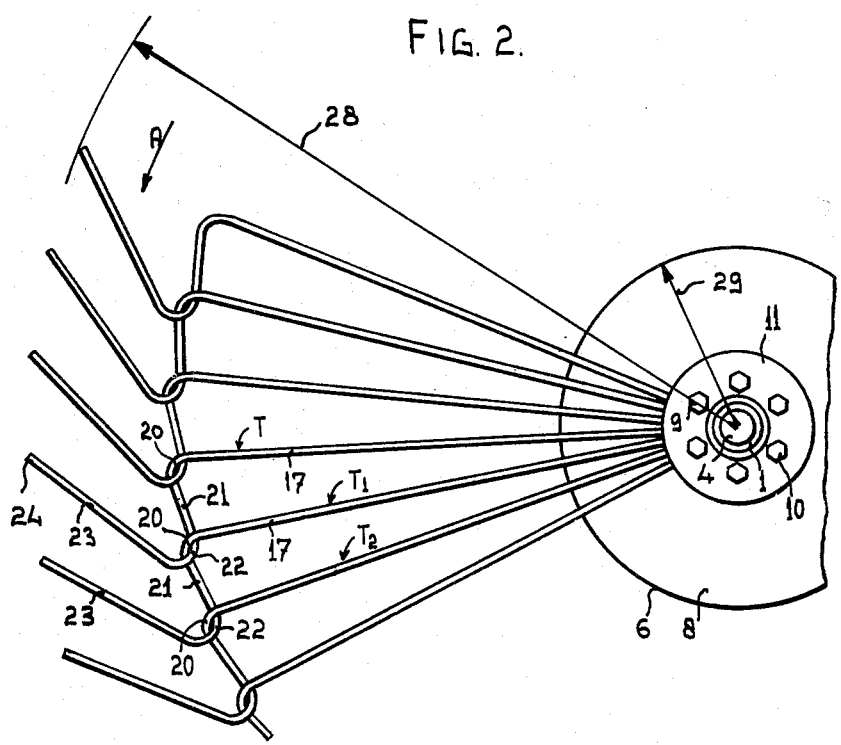

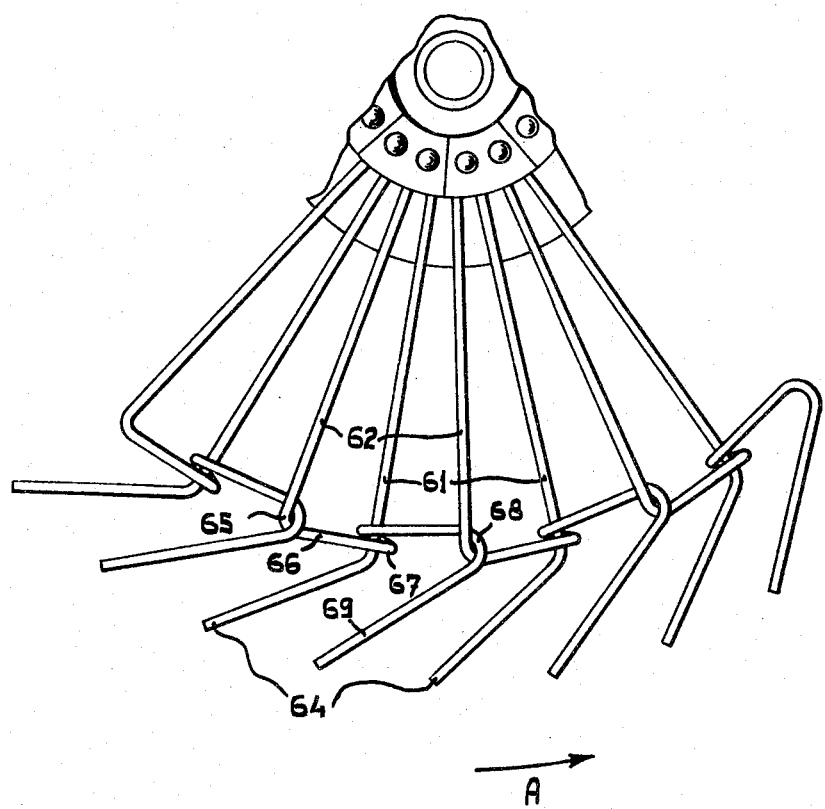

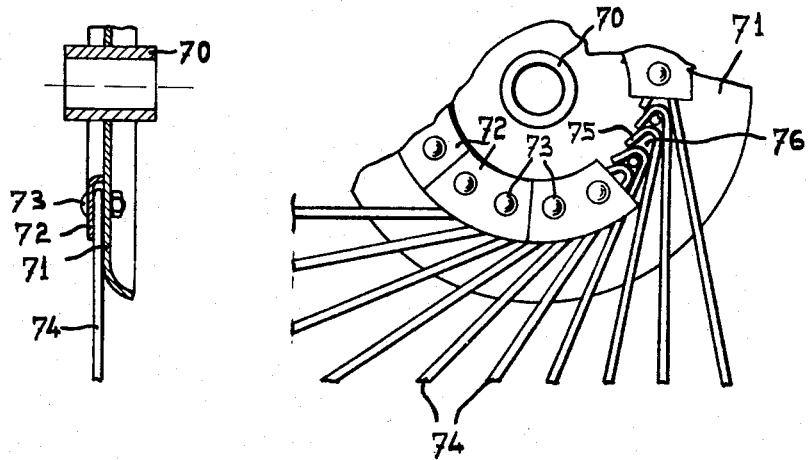

2,996,869
RAKE WHEELS
Cornelis van der Lely and Ary van der Lely, Maasland, Netherlands, assignors to C. van der Lely N.V.
Filed Apr. 3, 1957, Ser. No. 650,359
Claims priority, application Netherlands Apr. 5, 1956
26 Claims. (Cl. 56—377)

The present invention relates to rake wheels for use in farm implements and the like for effecting the lateral displacement of crops lying on the ground and, more particularly, is directed to rake wheels of the kind having resilient teeth projecting from the periphery thereof and secured to a central part of the wheel.

In the existing rake wheels of the described character, the several teeth are connected to each other by means of a rigid rim or by means of a similar rigid part closer to the center of the wheel and to which the teeth are firmly secured. In such existing rake wheel constructions, the rigid rim, or other similar rigid part, connecting together the several teeth restricts the resilient movement of the teeth, particularly in directions out of the plane of rotation of the rake wheel. With such relatively rigid assemblies, there is the danger that the teeth of the rake wheel will be bent or damaged when coming into contact with rocks or other obstructions projecting above the ground being traversed, or that the teeth will dig into the ground, when the latter is uneven, rather than merely laterally sweeping or displacing mown crops lying upon the ground.

Accordingly, it is an object of this invention to provide rake wheels having resilient teeth which dispense with the usual rigid rim or other rigid connection between the several teeth, and which are very simple in construction and therefore inexpensive to produce.

In accordance with an aspect of this invention, resilient tooth forming elements of the rake wheel, which are connected at their inner ends to a hub or other central part of the wheel, are provided with bent portions at locations between their inner connected ends and their outer free ends, such bent portions of adjacent teeth being interengageable to provide circumferential connections between the several resilient teeth, while permitting the individual teeth to be resiliently deflected out of the plane of rotation of the rake wheel.

The above, and other objects, features and advantages of the invention, will be apparent in the following detailed description of illustrative embodiments thereof which is to be read in connection with the accompanying drawings forming a part hereof, and wherein:

FIG. 1 is a fragmentary view of a rake wheel embodying the present invention and with parts broken away and shown in section;

FIG. 2 is a fragmentary front elevational view of the rake wheel of FIG. 1;

FIG. 10 is a fragmentary front elevational view of another embodiment of the invention;

FIG. 11 illustrates a modification of the hub structure of FIGS. 1 and 2; and

FIG. 12 illustrates a modification of the hub structure shown in FIGS. 1 and 2.

Figure 3:
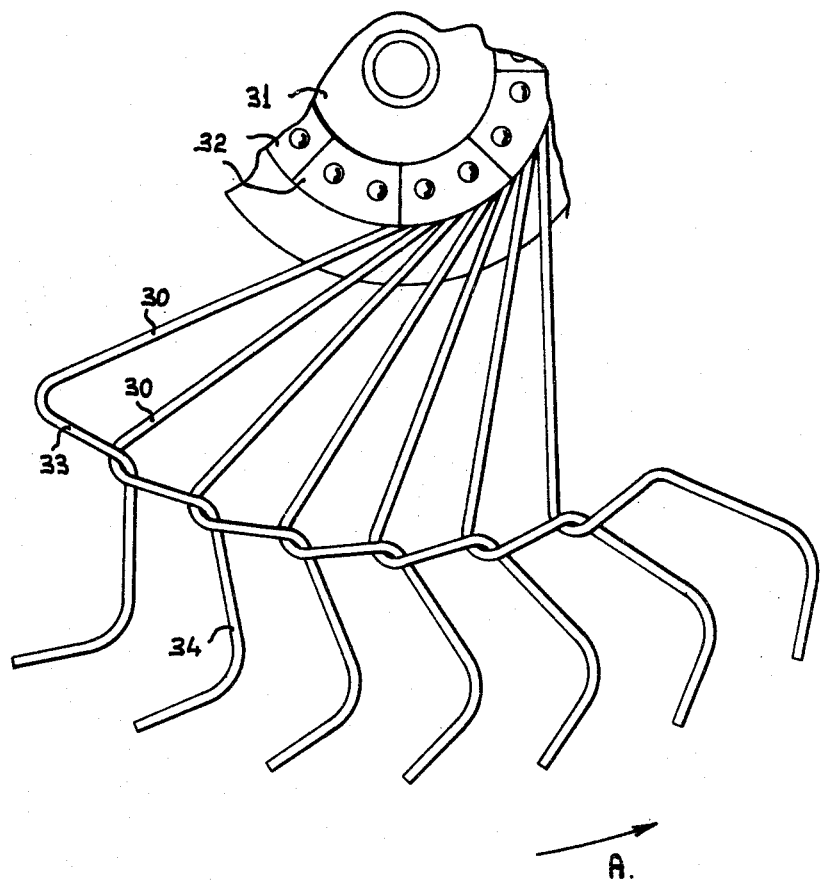
FIG. 3 is a fragmentary front elevational view of another embodiment of the invention.

Referring to the drawings in detail, and initially to FIGS. 1 and 2 thereof, it will be seen that a rake wheel embodying the present invention includes a sleeve 1 housing bearings 2 and 3 which rotatably support the sleeve upon a shaft 4 extending axially therethrough. An annular, radially directed ring 5 of relatively small outer diameter is welded on the outer surface of sleeve 1 adjacent the back end of the latter, while a relatively large diameter disc 6 having a central opening to receive the sleeve 1 is welded on the latter at a location spaced forwardly from the ring 5. As seen in FIG. 1, the outer portion of the disc 6 has a concave surface 7 at the side thereof facing toward the ring 5, while the opposite or forward surface of the outer portion of disc 6 is convex, as at 8. The sleeve 1, bearings 2 and 3, ring 5 and disc 6 form a hub of the illustrated rake wheel.

The ring 5 and disc 6 are formed with a series of axially aligned openings which are spaced radially outward from the sleeve 1 by only relatively small equal distances, and through which a plurality of bolts extend, six of such bolts being included in the illustrated embodiment and identified by the reference numerals 9 and 10. An annular ring 11 is slidable on the portion of sleeve 1 in front of disc 6 and is provided with suitable openings to receive the bolts 9 and 10, so that the latter can be employed for drawing the ring 11 axially toward the disc 6.

Further, the ring 5 has a series of circumferentially spaced apart openings 12 and 13 (FIG. 1) extending therethrough adjacent the periphery of the ring, and the disc 6 is formed with a corresponding series of openings 14 and 15 (FIG. 1) which are axially aligned or registered with the openings 12 and 13 of the ring 5.

The rake wheel of FIGS. 1 and 2 further includes a series of resilient tooth forming elements, identified generally by T, T1 and T2, and corresponding, in number, to the number of the openings 12 and 13 and of the openings 14 and 15 in the ring 5 and disc 6, respectively. Each tooth forming element is formed of a length of steel wire and includes a generally radially extending, straight shank portion 17 having a portion 16, at its inner end, bent at right angles to the shank portion 17. In assembling the several tooth forming elements on the hub of the rake wheel, the ring 11 is removed and the bent inner end portions 16 of the tooth forming elements are extended axially, in the rearward direction, through the aligned openings 14 and 12, and 15 and 13, of the disc 6 and ring 5, respectively. Then, the ring 11, which extends radially outward beyond the openings 14 and 15 of the disc 6, is re-installed upon the sleeve 1 and drawn axially toward the disc 6 by the bolts 9 and 10, thereby to prevent forward withdrawal of the inner bent end portions 16 of the tooth forming elements from the related openings of the ring 5 and disc 6.

As seen in Fig. 2, the straight shank 17 of the tooth forming element extends a substantial distance, in the radial direction, beyond the hub of the rake wheel and, at its outer end, has a portion 20 which is sharply bent in the direction of normal rotation of the rake wheel, as indicated by the arrow A. The sharply bent portion 20 of the tooth forming element extends into a straight portion 21 which is approximately tangentially directed and which, in turn, extends into a sharply bent portion 22 connected to a straight portion 23 terminating in a blunt end 24 and forming a resilient tooth. The straight portions 21 and 23 enclose an angle of approximately 40 degrees in the plane of rotation of the rake wheel so that the portion 23, which defines the raking tooth, is inclined or raked relative to a radius of the rake wheel in the direction away from the direction of rotation A. Thus, the described tooth forming element is made up of a single length of bent steel wire including the portions 16, 17, 20, 21, 22 and 23.

As seen in FIG. 1, the shank portion 17 and the tooth portion 23 of the tooth forming element T are both disposed in the same plane, to which the end part 16 is perpendicular, while the tangential portion 21 of the tooth forming element lies in a plane which is parallel to the plane of the portions 17 and 23 but spaced rearwardly therefrom by a distance substantially equal to the thickness of the steel wire forming the element T.

All of the other tooth forming elements, for example, the elements T1 and T2, are identical to the above described element T, and, in assembling together the several tooth forming elements of the rake wheel, the bent portion 22 of each tooth forming element is intertwined or interengaged with the bent portion 20 of the tooth forming element immediately in advance thereof, considered in the direction of rotation of the rake wheel. Thus, as seen in FIG. 2, the shank portion 17 of the element T1 passes in front of the tangential portion 21 of element T, while the tooth portion 23 of element T passes in front of the tangential portion 21 of element T1, thereby to hook together the bent portions 22 and 20 of the elements T and T1, respectively. Thus, the several tooth forming elements are movable interconnected at locations near the tooth portions 23 thereof, and the assembly of such tooth forming elements with the described hub forms a very simple and efficient rake wheel.

Specifically, in a rake wheel having the construction described above, a few of the tooth portions 23 can be deflected, in directions parallel to the axis of shaft 4, out of the radial plane of rotation of the rake wheel, while the movable interconnections between the several tooth forming elements ensure that the circumferential distances between the tooth portions 23 thereof will not exceed a predetermined value. Such limitation on the circumferential distance between the successive tooth portions 23 is achieved without the use of a rigid rim which has the disadvantage of maintaining all of the tooth portions in the same radial plane.

It is assumed that the rake wheel described above will be mounted upon a suitable farm implement so that the side of the rake wheel having the retaining ring 11 thereon faces generally in the direction of ground traversing movement of the implement. If the tooth portions 23 of the rotated rake wheel encounter an obstruction during movement over the ground, such tooth portions 23 will bend backwards, for example, as shown in broken lines at 23A on FIG. 1. With the tooth portion 23A deflected out of the radial plane of rotation of the rake wheel, the shank of the tooth forming element moves to the position 17A, shown in broken lines, and the inner end portion of the shank assumes a curved configuration, as at 27, and bears against the convex surface portion 8 of the disc 6.

It is apparent that, with the above described interengagement of the portions 20 and 22 of the successive tooth forming elements, each of the tooth forming elements, for example, the element T, can move circumferentially in the plane of rotation of the rake wheel only in the direction of rotation of the rake wheel, as indicated by the arrow A, relative to the immediately preceding tooth forming element, for example, the tooth forming element T1. Further, in order to insure the satisfactory, resilient action of the rake wheel and that the crop lying on the ground will be contacted only by the resilient tooth forming elements, it is desirable to provide the rigid central part of the rake wheel, for example, the ring 11 at the front, with a relatively small diameter. Specifically, the outer radius of the ring 11 is preferably smaller than ½ the outer radius of the rake wheel, that is, the radial distance from the axis of shaft 4 to the free ends 24 of the several tooth forming elements.

Referring now to FIG. 3 of the drawings, it should be noted that, in the rake wheel there illustrated, the hub structure 31 is generally similar to the hub structure described in detail in connection with the embodiment of FIGS. 1 and 2. In the embodiment of FIG. 3, the shank portions 30 of the several tooth forming elements extend substantially tangentially with respect to the hub structure 31 and the inner ends of such shank portions are mounted upon the hub structure in a manner similar to that described in connection with the embodiment of FIGS. 1 and 2, with the exception that the annual ring 11 of the first described embodiment is replaced by a plurality of segments 32 in the embodiment of FIG. 3 so that, by removing any of the segments 32, the related tooth forming elements can be removed and replaced without disturbing the mounting of any of the other tooth forming elements.

Further, in the embodiment of FIG. 3, each of the tooth forming elements includes a tangential portion 33 extending from the outer end of the shank portion 30 in the direction of rotation of the rake wheel, as indicated by the arrow A, and a projecting portion 34 which, in the plane of rotation of the rake wheel, forms an obtuse angle with the related tangential portion 33 and which terminates in a tip portion swept or raked in the direction opposed to the direction of rotation. Preferably, in a practical construction of the embodiment illustrated in FIG. 3, each projecting portion 34 of a tooth forming element has a length greater than 10 centimeters, and the described obtuse angular relationship of the projecting portion 34 to the related tangential portion 33 is desirable in order to insure a longer useful life for such long teeth in the face of the continued deformation thereof during operation.

Figure 4:
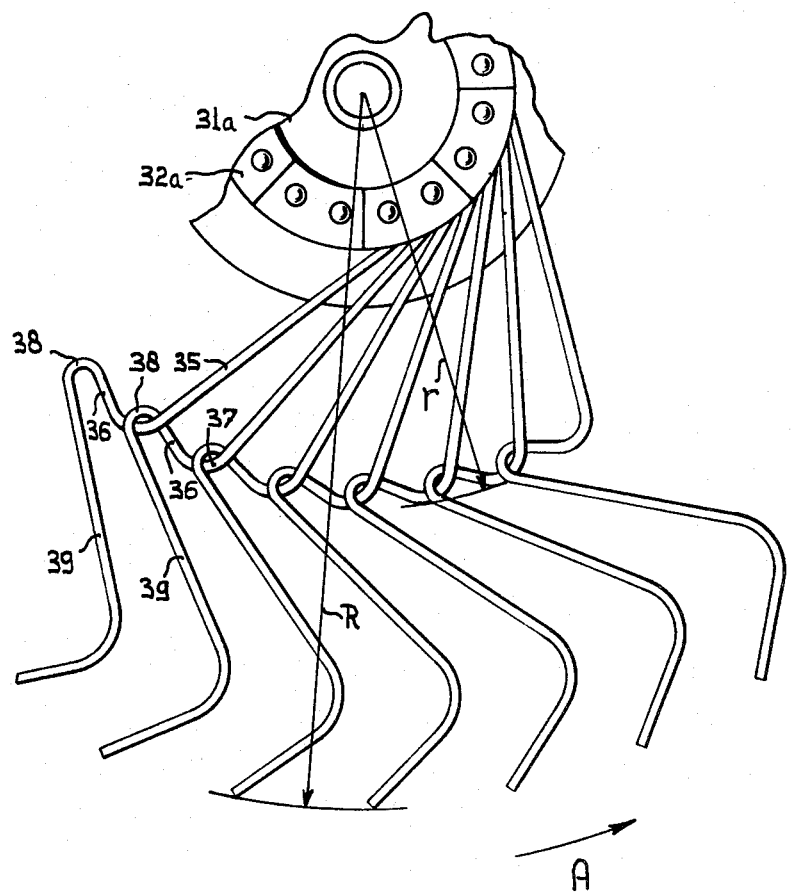
FIG. 4 is a fragmentary front elevational view of still another embodiment of the invention.

Referring now to FIG. 4 of the drawings, it will be noted that the rake wheel there illustrated includes a rigid hub structure 31a and tooth retaining segments 32a which are similar to the correspondingly numbered parts of the embodiment in FIG. 3. In the rake wheel of FIG. 4, each tooth forming element includes a straight shank portion 35 which is tangential to the hub structure, a tangential portion 36 extending from the outer end of the shank portion 35 substantially at right angles to the latter, but in the direction opposed to the direction of normal rotation, as indicated by the arrow A, contrary to the tooth forming elements of the embodiments in FIGS. 1 and 2 and FIG. 3, respectively, wherein the tangential portions 21 and 33 of the respective tooth forming elements extend from the related shank portions in the direction of normal rotation of the rake wheel. Each tooth forming element of the embodiment illustrated in FIG. 4 further includes a projecting portion 39 which extends from the portion 36 and which terminates in a tip portion raked in the direction opposed to the direction of normal rotation. Thus, each tooth forming element has an approximately right angle bend 37 between the portions 35 and 36 thereof, and a U-shaped bend 38 between the portions 36 and 39. The U-shaped bends 38 of the tooth forming elements lie substantially in the plane of rotation of the rake wheel, and the successive tooth forming elements are connected to each other by interengagement of each tooth forming element, specifically, at the bend 37 thereof, with the bend 38 of the element preceding it in the direction of rotation A.

Further, in the rake wheel of FIG. 4, the annular area defined between the periphery of the rake wheel, having the radius R, and the circumference, having the radius r along which the successive tooth forming elements are interconnected, in the manner described above, is preferably larger than one-half the total area bounded by the periphery of the rake wheel. In a practical construction of the embodiment shown in FIG. 4, the annular area defined between the radii r and R is approximately 0.67 of the total area bounded by a circle having the radius R.

Figure 5:
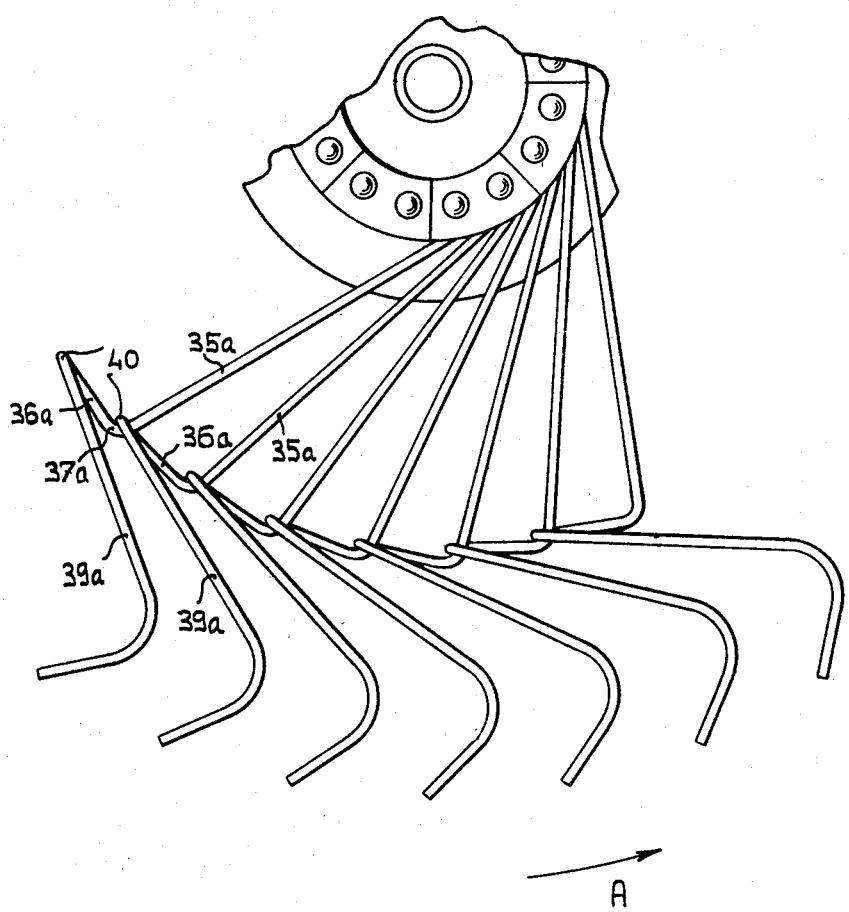
FIG. 5 is a fragmentary front elevational view showing a modification of the embodiment of FIG. 4.

Referring now to FIG. 5, it will be seen that the tooth forming elements of the rake wheel there illustrated are generally similar to the tooth forming elements of the rake wheel shown in FIG. 4. Accordingly, those portions of the tooth forming elements of FIG. 5 which correspond to the portions of the tooth forming elements in FIG. 4 are identified by the same reference numerals but with the letter "a" appended thereto. The tooth forming elements of the embodiment in FIG. 5 differ substantially from the tooth forming elements of FIG. 4 only in that the U-shaped bends 38 of the latter, which lie substantially in the plane of rotation of the rake wheel, are replaced by U-shaped bends 40 between the portions 36a and 39a which are disposed substantially in planes at right angles to the plane of rotation of the rake wheel. With the arrangement of the tooth forming portions illustrated in FIG. 5, the projecting portions 39a of the tooth forming elements are adapted to turn more readily about the axes of the related shank portions 35a, by tortional loading of the latter, whereas, in the embodiment of FIG. 4, deflections of the projecting portions 39 are, for the most part, accompanied by bending of the shank portions 35 and the U-shaped bends 38.

Figure 6:
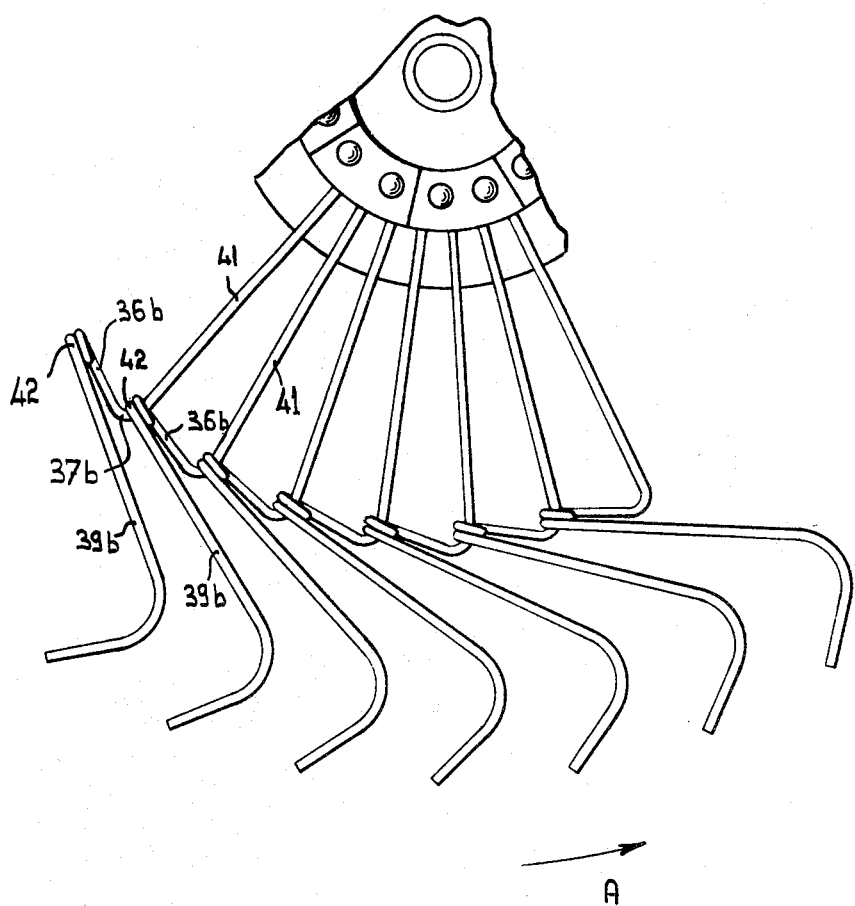
FIG. 6 is a fragmentary front elevational view of still another embodiment of the invention.

Referring now to FIG. 6, it will be apparent that the rake wheel there illustrated is generally similar to that shown in FIG. 5, with the exceptions that the shank portion 41 of each tooth forming element extends radially from the hub 31, rather than tangentially, as in FIG. 5, and that the U-shaped bend 40 of each tooth forming element in FIG. 5 is replaced by a complete turn or coil 42 forming an eye for receiving the right angle bend 37b of the following tooth forming element, considered in the direction of normal rotation of the rake wheel, as indicated by the arrow A. Thus, each tooth forming element of the embodiment in FIG. 6 includes a shank portion 41 mounted, at its inner end, on the hub structure in the manner previously indicated, a right angled bend 37b at the outer end of the shank portion 41, a generally tangentially directed portion 36b extending from the bend 37b in the direction opposed to the normal direction of rotation A, an eye 42 connecting the portion 36b to the projecting portion 39b which extends generally tangentially in the direction of rotation of the rake wheel and which has an end or tip part raked in the direction opposed to the normal rotation.

The construction illustrated in FIG. 6 serves to positively establish the circumferential distances between the outer ends of the shank portions 41 of the successive tooth forming elements, whereas, all of the previously described embodiments merely defined or limited the extent of the permissive movement of each of the tooth forming elements relative to the preceding tooth forming element in the direction opposed to the normal rotation.

Figure 7:
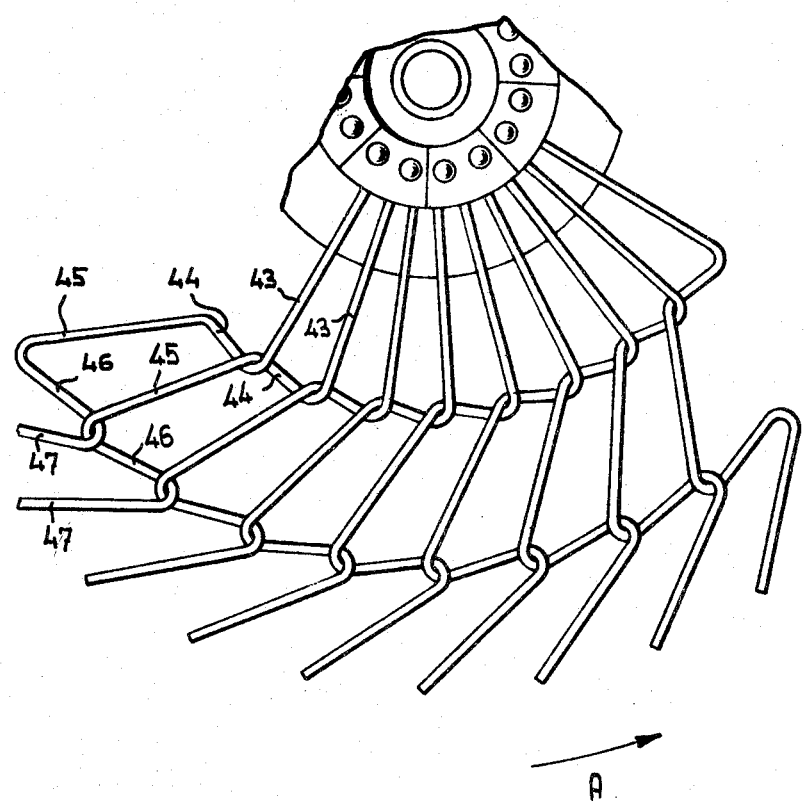
FIG. 7 is a fragmentary front elevational view of still another embodiment of the invention.

Referring now to FIG. 7, it will be seen that, in the rake wheel there illustrated, the hub construction is similar to that employed in the embodiments of each of FIGS. 3, 4, 5 and 6, whereas each of the tooth forming elements includes a shank portion 43 extending radially from the hub structure, a substantially tangential portion 44 extending from the outer end of the shank portion 43 in the direction opposed to the normal direction of rotation of the rake wheel, as indicated by the arrow A, a straight portion 45 extending generally radially outward from the portion 44, a tangential portion 46 extending from the outer end of the portion 45 in the direction of the normal rotation of the rake wheel, and a tooth portion 47 which extends from the tangential portion 46 and is raked in the direction opposed to the normal rotation. Each of the tooth forming elements of the embodiment in FIG. 7 has the portions 43, 45 and 47 thereof lying in the same plane, while the portions 44 and 46 lie in a plane which is parallel to, but spaced rearwardly from, the plane of the portions 43, 45 and 47 by a distance equal substantially to the diameter of the wire from which the element is formed. Thus, the bends of each tooth forming element between the portions 44, 45 and 46 thereof can be interengaged with the following tooth forming element at the bends of the latter between the portions 43 and 44 and the portions 46 and 47, as shown in the drawing, whereby the successive tooth forming elements are interconnected at two radially spaced apart locations.

Figure 8:
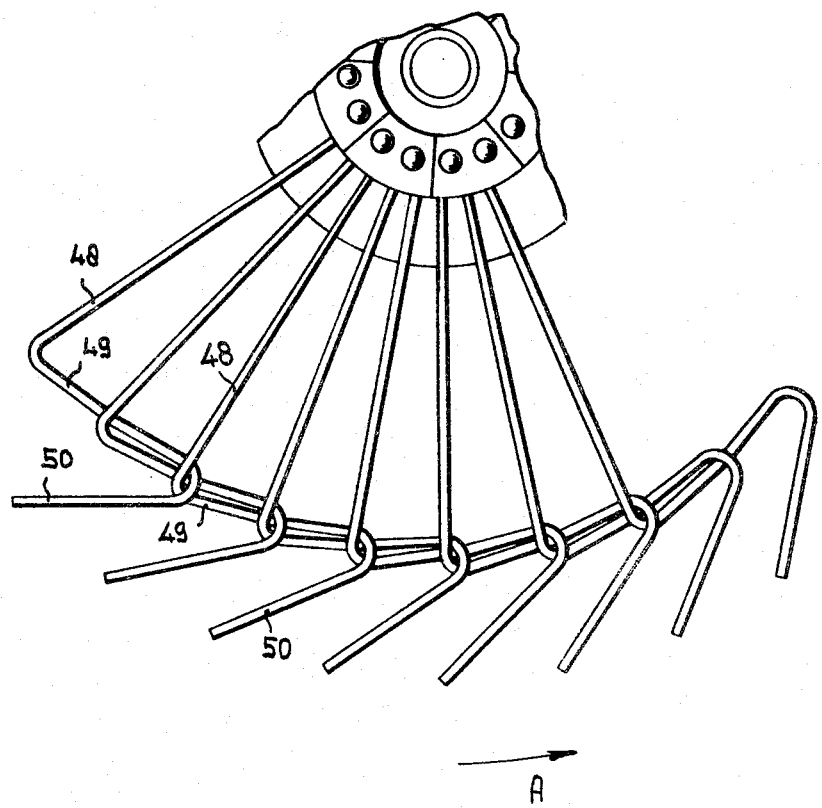
FIG. 8 is a fragmentary front elevational view of a further embodiment of the present invention.

Referring now to FIG. 8, it will be apparent that the tooth forming elements included in the rake wheel which is there illustrated are generally similar, in configuration, to the tooth forming elements of the embodiment illustrated in FIGS. 1 and 2. Thus, each of the tooth forming elements, in FIG. 8, includes a radially extending shank portion 48 which is mounted, at its inner end, on the hub structure, a tangential portion 49 extending from the outer end of the shank portion 48 in the direction of normal rotation, as indicated by the arrow A, and a tooth portion 50 which extends from the tangential portion 49 and encloses an acute angle therewith in the plane of rotation. Each tooth forming element, in FIG. 8, is distinguished from the tooth forming elements, in FIGS. 1 and 2, by reason of the fact that the tangential portion 49 of the tooth forming element has a length which is approximately equal to twice the circumferential distance between the shank portions 48 of successive tooth forming elements at the locations where the latter are to be interconnected. Thus, in the embodiment of FIG. 8, the bend between the portions 49 and 50 of each tooth forming element is interengaged with the bend between the portions 48 and 49 of the tooth forming element which is spaced from the first mentioned tooth forming element by an intervening or intermediate tooth element. In other words, in the arrangement illustrated in FIG. 8, there is an overlapping interconnection of the successive tooth forming elements. It is apparent that, if desired, the tangential portions 49 of the tooth forming elements can be further extended so that two or more tooth forming elements are interposed between the tooth forming elements which are interconnected.

Figure 9:
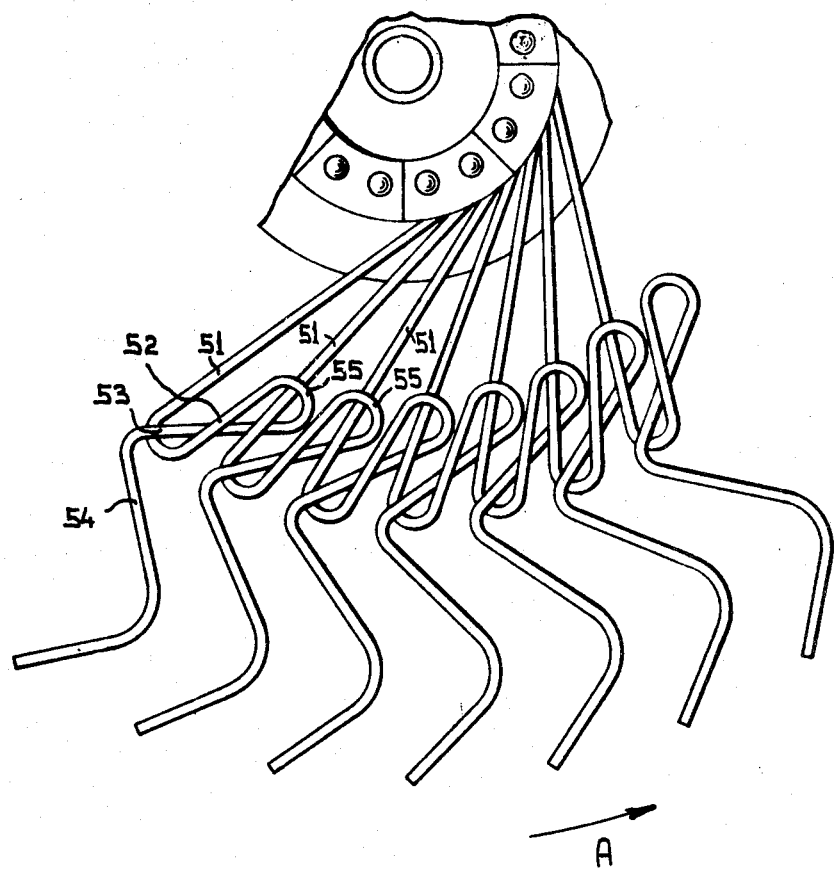
FIG. 9 is a fragmentary front elevational view of a still further embodiment of the present invention.

Referring now to FIG. 9, it will be seen that, in the rake wheel which is there illustrated, each of the tooth forming elements includes a straight shank portion 51 extending substantially tangentially from the hub structure and secured, at its inner end, to the latter, a portion 52 which extends inwardly generally parallel to the portion 51 and is connected to the outer end of the latter by a U-shaped bend, a portion 53 which extends substantially tangentially from the inner end of portion 52 in the direction opposed to the normal rotation, as indicated by the arrow A and which passes in back of the portion 52 and then in front of the U-shaped bend between the portions 51 and 52 in order to be supported on such bend and to define or form a loop 55 between the portions 52 and 53, and, finally, a projecting portion 54 extending from the portion 53 and terminating in an end part or tip which is raked in the direcron opposed to the normal rotation. It will be seen that the loop 55 of each tooth forming portion is directed substantially toward the axis of rotation of the rake wheel and is adapted to receive the shank portion 51 of the preceding tooth forming element, whereby the successive tooth forming elements are interconnected by the reception of each shank portion 51 in a loop portion 55 of the following tooth forming element. Since the portion 53 of each tooth forming element is supported on the bend at the outer end of the portion 51 of the same element, and, since the portion 54 is at a sharp or acute angle relative to the portion 53, the latter serves as an axis of rotation for the tooth portion 54.

The embodiment shown in FIG. 10 has a central construction such as has already been described with reference to FIG. 3; however, two different types of teeth are employed. One of the types is provided on a shank portion or rod 61 integral with which is a portion 64 which serves as the tooth proper. For the other type, a shank portion or rod 62 is turned at 65 into a substantially tangential portion 66 in which a loop 67 is provided. This tangential portion 66 is directed at a bend 68 into portion 69 which serves as the tooth proper. Two successive rods 62 are interconnected at their respective portions 65 and 68 whereas the rods 61 are supported in the loops 67 of the rods 62.

In the construction shown in FIGS. 11 and 12, there is provided a hub 70 to which a supporting plate 71 is welded or otherwise secured. A second supporting plate consists of a plurality of segments 72 which are secured to the first supporting plate 71 by means of bolts 73. Between the supporting plates are arranged spokes 74 which are curved at their ends to form hooked portions 75. The curved ends of the various spokes are juxtaposed and a space 76 results intermediate adjacent ends. Spaces 76 accommodate bolts 73, the supporting plates 71 and 72 being spaced from one another by a distance whereby the spokes 74 are locked in a coplanar relationship. This type of fastening may also be used when the spokes are, for example, hairpin-shaped.

All of the described embodiments of the invention have the important advantage of maintaining the structural coherence of the rake wheel even in the event of a breakdown of a plurality of teeth, since, usually, the projecting part of the tooth forming element will break off, if at all, at a point beyond the location where that tooth forming element is connected to another element.

Although illustrative embodiments of the invention have been described in detail herein with reference to the accompanying drawings, it is to be understood that the invention is not limited thereto, and that various changes and modifications may be effected in those embodiments without departing from the scope or spirit of the invention, except as defined in the appended claims.

What is claimed is:

1. A rimless rake wheel for use in an implement for laterally displacing crops lying on the ground; said rake wheel comprising a central hub structure, and a series of resilient tooth forming elements including inner ends connected to said central hub structure and including outer, free end portions constituting resilient teeth, said tooth forming elements including V-shaped bent portions located intermediate their inner and free ends, a bent portion of each of said tooth forming elements being in hooked engagement with a bent portion of another of said elements, the interconnected bent portions including limbs extending in opposite directions from where the bent portions contact one another to limit angular spreading apart in the plane of rotation of the rake wheel of the elements in hooked engagement with each other, said elements freely extending from said hub structure to their respective bent portions, the engagement of said elements substituting for a rim whereby the wheel is rimless.

2. A rake wheel as claimed in claim 1; wherein each tine has a spoke portion, a portion substantially tangential to a circle defined by the outer ends of the spoke portions and an outwardly extending foot portion, whereby the tines are hooked onto one another by the engagement of the junction between the spoke portion and the tangential portion of one tine with the junction between the tangential portion and the foot portion of another tine.

3. A rake wheel as claimed in claim 1; wherein the foot portion extends such that at least part thereof extends rearwardly relative to the intended direction of rotation of the rake wheel.

4. A rimless rake wheel for use in an implement for laterally displacing crop lying on the ground; said rake wheel comprising a central hub structure and a plurality of circumferential, resilient crop-engaging members including a plurality of spoke-like portions extending outwardly from the central part of the rake wheel to constitute a crop-engaging surface of the rake wheel, said spoke-like portions being detachably connected to one another at their outer ends and secured at their inner ends to said central hub structure, each member including one of said spoke-like portions, the outer end of which is continued to form a foot portion adapted to engage the ground and crop lying thereon.

5. A rake wheel as in claim 1; wherein the outer diameter of the rake wheel, measured to said free ends of the tooth forming elements, is at least twice as large as the diameter of said central hub structure.

6. A rake wheel as in claim 1; wherein the annular area bounded by the outer periphery of the rake wheel, as defined by said free ends of the tooth forming elements, and by the circular line along which said tooth forming elements are in hooked engagement with each other, is larger than one-half of the circular area bounded by said outer periphery of the rake wheel.

7. A rake wheel as in claim 1; wherein said bent portions of said tooth forming elements open generally in the direction opposed to the direction of normal rotation of the rake wheel, and the bent portion of each element is in hooked engagement with an adjacent element so that each of said elements is movable in said plane of rotation of the rake wheel only in said direction of normal rotation relative to said element in advance thereof with which its bent portion is in hooked engagement.

8. A rake wheel as in claim 1; wherein each of said tooth forming elements has at least one tangentially directed portion, and said bent portion of each element is interposed between said outer free end portion and said tangentially directed portion of the related element.

9. A rake wheel as in claim 8; wherein said outer free end portion of each element defining a resilient tooth on the latter and said tangentially directed portion of the related tooth forming element enclose an acute angle in said plane of rotation of the rake wheel.

10. A rake wheel as in claim 8; wherein said outer free end portion of each element defining a resilient tooth on the latter has a length exceeding 10 centimeters, and said outer free end portion and said tangentially directed portion of each tooth forming element enclose an obtuse angle in said plane of rotation of the rake wheel.

11. A rake wheel as in claim 1; wherein said bent portions of the tooth forming elements lie substantially in said plane of rotation of the rake wheel.

12. A rake wheel as in claim 1; wherein said bent portions of the tooth forming elements lie in planes which are substantially at right angles to said plane of rotation of the rake wheel.

13. A rake wheel as in claim 1; wherein said bent portion of each tooth forming element is closed to define an eye receiving said other tooth forming element, thereby to prevent movement of the elements in hooked engagement with each other both toward and away from each other in said plane of rotation of the rake wheel.

14. A rake wheel as in claim 1; wherein each of said tooth forming elements has a straight shank portion terminating at said inner end secured to the central hub structure and extending substantially tangentially from the latter.

15. A rake wheel as in claim 1; wherein said bent portion of each of said tooth forming elements is in hooked engagement with said other tooth forming element at two locations which are spaced apart in the generally radial direction along said other tooth forming element.

16. A rake wheel as in claim 15; wherein said bent portion of each of said tooth forming elements includes two radially spaced apart, substantially tangential portions and a substantially radially extending portion therebetween, said bent portion of each tooth forming element engaging said other tooth forming element at bends between said tangential portions and said radial portion.

17. A rake wheel as in claim 1; wherein said bent portions of said tooth forming elements open generally in the direction of the normal rotation of the rake wheel, and the bent portion of each element is in hooked engagement with a following element, considered in said direction of normal rotation, so that each of said elements is movable in said plane of rotation of the rake wheel only in said direction of normal rotation relative to an element in advance thereof with the bent portion of which it is in hooked engagement.

18. A rake wheel as in claim 1; wherein each of said tooth forming elements has a tangential portion terminating in said bent portion in hooked engagement with another of said tooth forming portions, said tangential portion having a length substantially equal to twice the circumferential distance desired between successive tooth forming elements at the radial location where said elements are in hooked engagement with each other, and said other tooth forming element with which said bent portion of each element is in hooked engagement being spaced from the latter by at least one intervening tooth forming element.

19. A rake wheel as in claim 1; wherein said bent portion of each of said tooth forming elements includes a closed loop directed from the related element substantially toward the axis of rotation of the rake wheel and embracing said other tooth forming element to effect said hooked engagement.

20. A rake wheel as in claim 19; wherein each of said tooth forming elements further includes a straight shank portion and a U-shaped bend at the outer end of the latter, and said closed loop has two intersecting legs and a bight connecting the latter, one of said legs extending from said U-shaped bend and the other of said legs crossing said one leg at one side of the latter and then crossing said U-shaped bend at the opposite side so that said other leg of the closed loop is supported against said U-shaped bend while being free to rock about its longitudinal axis.

21. A rake wheel as in claim 20; wherein said tooth defining outer free end portion of each element and said other leg of the related closed loop enclose an angle of less than 90 degrees in said plane of rotation of the rake wheel so that deflection of said outer free end portion out of said plane of rotation is resiliently resisted by torsional loading of said other leg.

22. A rake wheel as claimed in claim 1 wherein said tooth forming elements are provided in two distinct types alternately arranged; the first of said types comprising a tangential portion, a loop portion in said tangential portion, and a tooth portion extending from said tangential portion, successive elements of said first type being intertwined in mutual engagement; the second of said types comprising a shank portion engaged in said loop portion, and a tooth portion extending from said shank portion.

23. A rake wheel as claimed in claim 4; wherein the inner ends of said spoke forming elements are hooked, the hooked ends being positioned in said hub structure; said hub structure comprising spaced elements sandwiching said hooked ends therebetween.

24. A rake wheel as claimed in claim 4; including bolts for fastening said spaced elements together, said bolts being engaged by said hooked ends.

25. A rake wheel as claimed in claim 4; wherein at least the spaced element lying on the side of the rake wheel towards which the spokes deviate during operation has a diameter which is at least one-fifth of the diameter of the rake wheel, measured to the free ends of the spoke forming elements.

26. A rake wheel as claimed in claim 4; wherein the spaced element which is disposed as opposed to direction of movement of the device has a concave surface facing towards the spoke forming elements.

References Cited in the file of this patent

UNITED STATES PATENTS 720,098     Bamford _____ Feb. 10, 1903

FOREIGN PATENTS 1,113,379     France _____ Dec. 5, 1955